United States Patent
Hansson et al.

(10) Patent No.: US 6,995,539 B1
(45) Date of Patent: Feb. 7, 2006

(54) DEVICE AND A METHOD FOR ESTIMATING THE SPEED OF A SLIP RING ASYNCHRONOUS MACHINE

(75) Inventors: Lars Tuve Hansson, Bålsta (SE); Alojz Slutej, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/110,428

(22) PCT Filed: Oct. 12, 2000

(86) PCT No.: PCT/SE00/01980

§ 371 (c)(1),
(2), (4) Date: Aug. 12, 2002

(87) PCT Pub. No.: WO01/27637

PCT Pub. Date: Apr. 19, 2001

(30) Foreign Application Priority Data

Oct. 12, 1999 (SE) .................................. 9903666

(51) Int. Cl.
*H02P 5/34* (2006.01)
*H02P 7/42* (2006.01)

(52) U.S. Cl. ................. 318/800; 318/805; 318/822; 318/798

(58) Field of Classification Search ........ 318/800–815, 318/727
See application file for complete search history.

(56) References Cited

U.S. PATENT DOCUMENTS

| | | | | |
|---|---|---|---|---|
| 4,019,104 A | * | 4/1977 | Parker | 318/832 |
| 4,078,189 A | | 3/1978 | Nash et al. | 318/227 |
| 4,780,658 A | | 10/1988 | Koyama | 318/808 |
| 4,884,016 A | * | 11/1989 | Aiello | 318/685 |
| 4,896,090 A | * | 1/1990 | Balch et al. | 318/52 |
| 5,159,255 A | * | 10/1992 | Weber | 318/775 |
| 5,163,170 A | * | 11/1992 | Grabowski | 318/113 |
| 5,272,429 A | * | 12/1993 | Lipo et al. | 318/808 |
| 5,334,923 A | * | 8/1994 | Lorenz et al. | 318/805 |
| 5,585,709 A | * | 12/1996 | Jansen et al. | 318/807 |
| 5,619,435 A | * | 4/1997 | Prakash et al. | 703/3 |
| 5,729,113 A | * | 3/1998 | Jansen et al. | 318/799 |
| 5,739,664 A | | 4/1998 | Deng et al. | 318/808 |
| 5,929,400 A | * | 7/1999 | Colby et al. | 187/393 |
| 6,069,467 A | * | 5/2000 | Jansen | 318/802 |
| 6,199,018 B1 | * | 3/2001 | Quist et al. | 702/34 |
| 6,326,760 B1 | * | 12/2001 | Cardoletti et al. | 318/700 |
| 6,429,612 B1 | * | 8/2002 | Kume et al. | 318/139 |

FOREIGN PATENT DOCUMENTS

| | | |
|---|---|---|
| DE | 198 09 764 A1 | 9/1999 |
| EP | 0 468 499 A2 | 1/1992 |
| GB | 1 600 868 | 10/1981 |
| SU | 830244 | 5/1981 |

* cited by examiner

Primary Examiner—Marlon T. Fletcher
Assistant Examiner—Renata McCloud
(74) Attorney, Agent, or Firm—McCormick, Paulding & Huber LLP

(57) ABSTRACT

The invention relates to a device and a method for estimating the speed of a slip ring asynchronous machine. The asynchronous machine includes a stator having a stator winding, arranged to be fed with three-phase voltage and current in order to generate a varying magnetic flux, and a rotor having a rotor winding in which the magnetic flux is arranged to induce a voltage to create an electromagnetic torque. The device includes a measuring member arranged to measure the value of the voltage in the rotor winding during at least one time period and a calculating unit, which is arranged, using the above measured voltage, to calculate a value of the rotor speed.

17 Claims, 2 Drawing Sheets

DEVICE AND A METHOD FOR ESTIMATING THE SPEED OF A SLIP RING ASYNCHRONOUS MACHINE

CROSS-REFERENCE TO RELATED APPLICATIONS

This application is entitled to the benefit of and incorporates by reference essential subject matter disclosed in International Application No. PCT/SE00/01980 filed on Oct. 12, 2000 and Swedish Patent Application No. 9903666-7 filed on Oct. 12, 1999.

TECHNICAL FIELD OF THE INVENTION AND PRIOR ART

The invention relates to a device and a method for estimating the speed of a slip ring asynchronous machine, wherein the asynchronous machine comprises a stator having a stator winding, arranged to be fed with three-phase voltage and current in order to generate a varying magnetic flux, and a rotor having a rotor winding in which the magnetic flux is arranged to induce a voltage to create an electromagnetic torque which drives the rotor with a rotor speed with a slip in relation to a rotation speed of the varying magnetic flux.

Such slip ring asynchronous machines are used, for example, in cranes, rolling mills, in heavy industry and in lifting devices like elevators. In a crane may, for example, four asynchronous machines be used to supply a motion to a load lifted by the crane. A control system, for example, ASTAT may be used to control said motion. Usually, the control system controls the machines by the use of a pair of thyristors in each phase for regulating the voltage and current supplied to the stator winding of the machines. The control system is arranged to obtain information about the actual motor speed from measuring members in order to provide a stable control of the load. Such measuring members are, for example, tachometers or optical sensors. However, tachometers, together with the associated necessary equipment, are mechanically sensitive and require a large space.

SUMMARY OF THE INVENTION

The object of the present invention is to provide a device and a method for estimating the speed of a slip ring asynchronous machine, which enable an estimation of the rotor speed with a high precision and at the same time provides a product which is light, and easy to use in a control system.

This object is achieved according to the initially mentioned device, which is characterised in that the device comprises a measuring member arranged to measure the value of the voltage in the rotor winding during at least one time period and a calculating unit which is arranged, by means of the above measured voltage, to calculate a value of the speed of the rotor. By measuring the voltage during a time period, it is possible to obtain a value of the voltage during the time period. From such values, it is possible to analyse the oscillation of the voltage during the time period and, by means of the calculating unit, to calculate the voltage frequency. By the knowledge of the calculated voltage frequency, it is easy to calculate the slip and thereafter the rotor speed by means of the calculating unit.

According to a preferred embodiment of the invention, the measuring member is arranged to output a signal corresponding to the value of said measured voltage and that the device comprises a signal processor, which is arranged to remove noise from the signal before said calculation. In the most cases, the voltage signal is very fluctuating due to disturbances. Thereby, a signal processor may be used to remove noise from the measured voltage signal before a successful calculation is possible. Such a signal processor may comprise an analog signal processor unit. In this analog processor unit, an analog signal is transformed and filtered. This may be done by, for example, operational amplifiers and resistor-capacitor networks. Preferably, the signal processor also may comprise an A/D converter. The A/D converter converts the signal from an analog signal to a digital signal by means of, for example, high-speed sigma delta filters. Finally, the signal processor may comprise a digital signal processor unit. In the digital signal processor unit a digital filtration of the signal is performed. The output signal from the signal processor is now relatively clear. Thereby, the calculating unit may with high precision calculate the frequency of the rotor voltage and after that the slip and finally the rotor speed. Preferably, the calculating unit calculates the voltage frequency, the slip and the rotor speed by means of a mathematical algorithm.

According to another preferred embodiment of the invention, the device comprises means for monitoring the calculated value of the rotor speed in order to detect faults in the asynchronous machine. Such faults may occur within the machine or the resistors, which is connected in a circuit to the rotor winding. Also breaks of electrical cables in the vicinity of the machine may be detected. Preferably, said means is arranged to monitor a number of asynchronous machines. In that way, it is possible to detect a fault in one asynchronous machine of four, for example, in a crane. By that, it is possible to prevent that the working asynchronous machines work at a too high torque, which may shorten their operating life. In order to give information to an operator, a display may be arranged to display comprehensive information about the statement of the machine.

According to another preferred embodiment of the invention, the device is a part of a control system for a slip ring asynchronous machine, which control system comprises a control unit, which is arranged to use the calculated value of the rotor speed in order to control the asynchronous machine. Consequently, in such a control system the device is very useful in order to enable an exact control of the asynchronous machine. Such a control unit may be arranged to control a thyristor device in order to supply said three-phase voltage and current to the stator. The fed voltage and current will not in this case always be sinusoidal. The control unit may be arranged to obtain a control signal from an operating device commanded by an operator. Such an operating device may comprise one or two joysticks. By means of the position of the joystick, the operator will move a load by the crane in a desired direction and with a desired speed.

According to another preferred embodiment of the invention, the control system comprises a display, which is arranged to display comprehensive information about the statement of the asynchronous machine. For example, the rotor speed, the shaft torque, the stator current and voltage may be displayed. Other comprehensive information to be displayed is if faults occurring, for example, in the machine, cables or thyristors.

The invention comprises also a method for estimating an electromagnetic torque of a slip ring asynchronous machine. The method relates to the initially defined machine and comprises the step to measure the value of the voltage in the rotor winding during at least a time period and to calculate a value of the rotor speed by means of the above measured voltage. By measuring the value of the voltage during a time period, the oscillation periods of the voltage during the time period may be determinable and by that the slip and finally the rotor speed.

According to another preferred embodiment of the invention, the method comprises the step to output a signal corresponding to the value of said measured voltage and to remove noise from the signal in a signal processor before said calculating. In most cases, the measured voltage is fluctuating a great deal due to disturbances and the oscillation periods of the voltage are difficult to determinate. By that reason, a removal of noise from the signal is necessary to obtain a clear signal from which the voltage frequency may be calculated. Thereby, the method comprises the step to remove noise from the signal in an analog signal processor. The output signal from a measuring member is often an analog signal and a removal of noise from the signal in an analog signal processor is necessary. Thereafter, the method may comprise the step to convert the analog signal to a digital signal. In order to facilitate the calculation of the voltage frequency, a digital signal is to be preferred over an analog signal. Finally, the removal of noise from the signal may comprise the step to remove noise from the signal in a digital signal processor. In this case, a digital filter filters the signal.

According to another preferred embodiment of the invention, the method comprises the step to calculate the rotor speed by means of an output signal from the signal processor unit. The output signal from the signal processor unit is now rather clear. Therefore, it is possible to calculate the voltage frequency from this signal and by that the slip and finally the rotor speed. Preferably, this calculation is performed by means of a mathematical algorithm.

According to another preferred embodiment of the invention, the method comprises the step to monitor the calculated value of the rotor speed in order to detect errors in the function of the asynchronous machine. Thereby, an effective detecting of faults in the asynchronous machine is obtained.

BRIEF DESCRIPTION OF THE DRAWINGS

In the following the invention is described by way of examples with reference to the attached drawings, in which.

DETAILED DESCRIPTION OF A PREFERRED EMBODIMENT OF THE INVENTION

Figure 1:
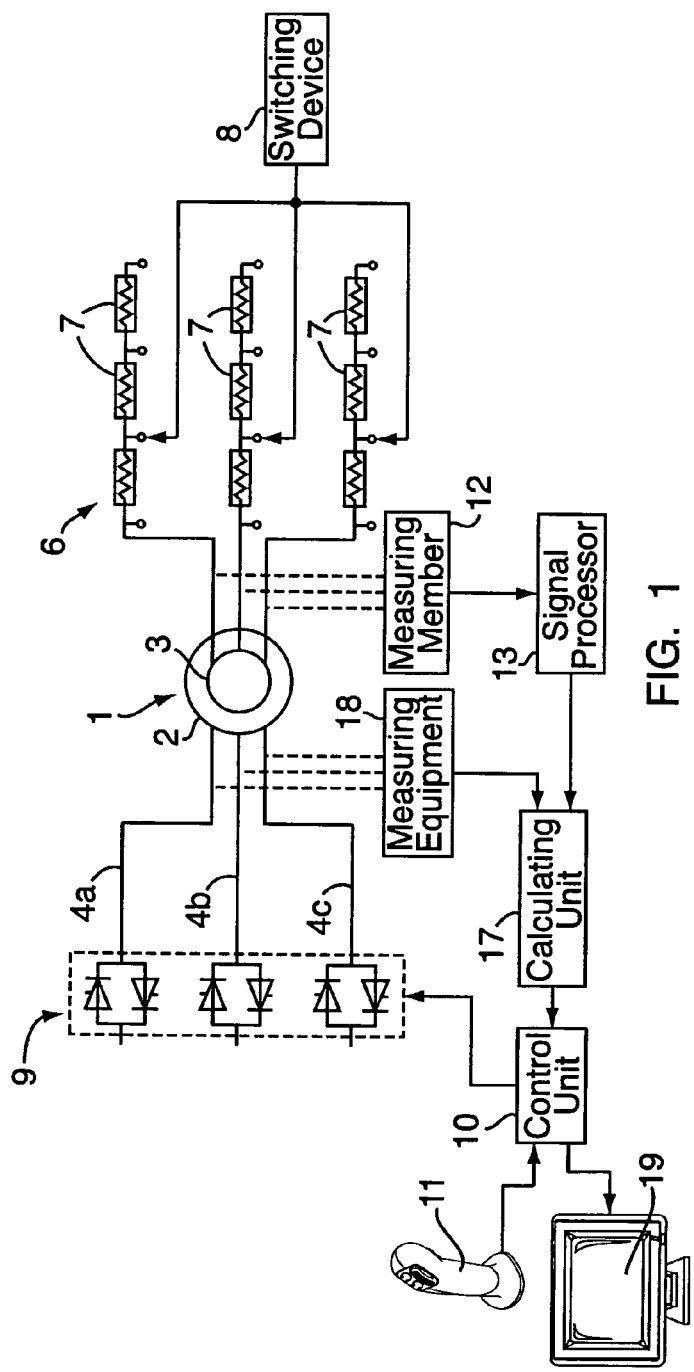
FIG. 1 shows schematically a control system using a device according to the invention for estimating the rotor speed.

FIG. 1 shows schematically a control system using a device for estimation of the rotor speed of a slip ring asynchronous machine 1. Preferably, said control system may be used for controlling an arbitrary number of asynchronous machines, for examples, four asynchronous machines 1 in a crane. The asynchronous machine 1 comprises a stator 2 and a rotor 3. The stator 2 has a stator winding and the rotor 3 has a rotor winding. The asynchronous machine 1 is fed with three-phase voltage and current by cables 4a–c. The supplied three-phase voltage and current to the stator winding generates a varying magnetic flux, which induces a voltage in the rotor winding. The voltage in the rotor winding creates an electromagnetic torque, which drives the rotor 3 with a rotor speed with a slip in relation to a rotational speed of the varying magnetic flux. A circuit 6 including a plurality of resistors 7 is connected to each phase of the rotor winding. The circuits 6 include a desired number of resistors 7. A switching device 8 is provided to the circuits 6 for connecting a desired numbers of resistors in the circuits 6 in order to vary the resistance.

A thyristor device 9 is provided to control the supply of voltage and current to the stator 2. The thyristor device 9 consists of a pair thyristors in each phase. By the use of such thyristors, the voltage to the stator 2 may be reduced continuously from a full line voltage to zero. A control unit 10 is provided to control the thyristor device. Such a control unit 10 may be a microprocessor or a computer, which orders the thyristors to switch to an on state by adjusting the phase position of trigger pulses, hence applying more or less stator voltage.

An operator of, for example, a crane is by means of an operating device, which may be at least one joystick 11, arranged to control the motion of a load lifted by the crane. The operator may by means of the joystick control the voltage and current supplied to the asynchronous machines 1 and thus the load lifted by the crane. The operator commands the joystick 11 to a desired position to control the movement of the load. Thereby, a signal related to the position of the joystick 11 is sent to the control unit 10. Thereafter, the control unit 10 orders the thyristor device 9 to supply a required level of voltage and current to the stator winding. In that way, the asynchronous machine 1 obtains a desired speed.

In order to control the speed of the asynchronous machine 1 with a high precision, the control system comprises a first device for estimating the actual rotor speed. The first device comprises a measuring member 12. The measuring member 12 is connected to the circuits 6 for measuring the induced voltage in the rotor winding, in each phase. The measuring member 12 measures the rotor voltage during at least one time period. Thereafter, the measuring member 12 outputs an analog signal related to the measured values of the rotor voltage during the time period. This measured analog signal is often fluctuating due to disturbances. Consequently, the signal may not immediately be used for calculating the frequency of the rotor voltage. Therefore, the output signal from the measuring member 12 is led to a signal processor 13. The signal processor 13 is arranged to transform and filter the signal in order to remove noise.

Figure 2:
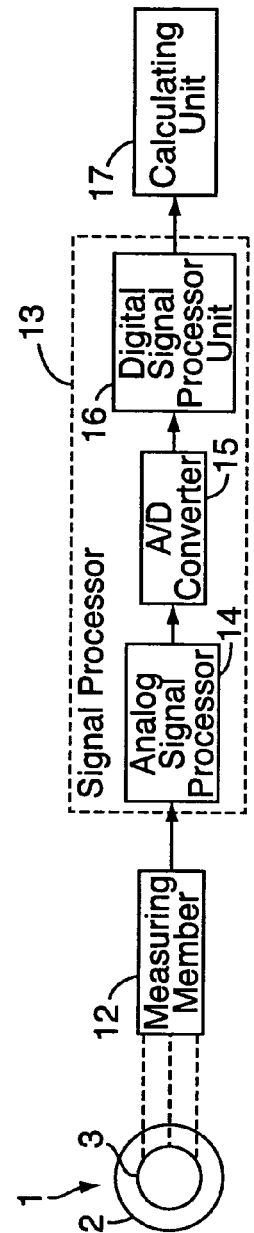
FIG. 2 shows schematically the signal processor in FIG. 1.

FIG. 2 shows schematically a signal processor 13. The signal processor 13 comprises, in this case, an analog signal processor unit 14. The analog signal processor unit 14 is arranged to provide an analog transformation and filtering of the output signal from the measuring member 12. This may be performed by means of operation amplifiers and resistor-capacitor networks. Thereafter, the signal is led to an A/D converter 15. The A/D converter converts the analog signal to a digital signal. Finally, the signal processor 13 comprises a digital signal processor unit 16. The digital signal processor unit 16 comprises digital filters and performs a digital filtering of the signal. The output signal from the signal processor 13 is now relatively clear and essentially free from disturbances. The output signal is led to a calculating unit 17. The calculating unit 17 calculates the frequency of the rotor voltage by means of this signal. By knowledge of the frequency of the rotor voltage, the calculating 17 unit then calculates the slip of the asynchronous machine 1 and finally the rotor speed. The calculating unit 17 uses a mathematical algorithm for these calculations. Thereafter, the calculating unit 17 outputs a signal related to the actual value of the rotor speed to the control unit 10. The calculating unit 17 and the control unit 10 may be parts of a microprocessor or a computer. This first device, which estimates the actual rotor speed may be very compact and therefore requires only a small space.

In order to control the rotor speed with an additional precision, the control system comprises a second device for estimation of the actual electromagnetic torque of the asynchronous machine 1. The second device comprises measuring equipment 18. The measuring equipment 18 is arranged to measure at least two phases of the voltage and current supplied to the stator 2. If the asynchronous machine 1 is connected to a three-phase conventional power supply, for example, of 380 V, the value of the third phase may be calculated from the first and second phases. Such measuring equipment 12 may consist of current and voltage transformers and an isolation amplifier. The measuring equipment 18 is arranged to send an output signal to the calculating unit 17, which is related to the measured values of the voltage and current fed to the asynchronous machine 1. Thereby, the calculating unit 17 is arranged to obtain information about the actual voltage and current supplied to the stator 2. At the same time, the calculating unit 17 is arranged to obtain information about the actual rotor speed from the first device. The calculating unit 17 may, by this information and the knowledge of the properties of the specific asynchronous machine 1, calculate the actual electromagnetic torque for the asynchronous machine. The calculating unit 17 uses also in this case a mathematical algorithm for the calculation. This second device for estimation of the actual electromagnetic torque may also be very compact and thus requires only a small space.

The control unit 10 may, by the information about the actual electromagnetic torque and the position of the joystick 11, control the voltage and current supplied to the stator 2 by the thyristor device 9 in order to control the speed of at least one asynchronous machine 1. In, for example, a crane, an operator may regulate four asynchronous machines by one joystick in order to move a load. By means of the calculated values of the electromagnetic torque for each asynchronous machine 1, the control system will distribute the torque essentially equally to the asynchronous machines 1.

A display 19 is connected to the control unit 10. The display 19 is arranged to display comprehensive information about the state of the asynchronous machine 1. Red warning lights will, for example, be actuated at a machine or cable overtemperatur, brake fault, rotor/speed fault, overload, overspeed and thyristor overload. In other cases, a green light will indicate that the control system is OK. Other comprehensive information, which may be displayed, is motor speed, shaft torque and stator voltage and current.

Figure 3:
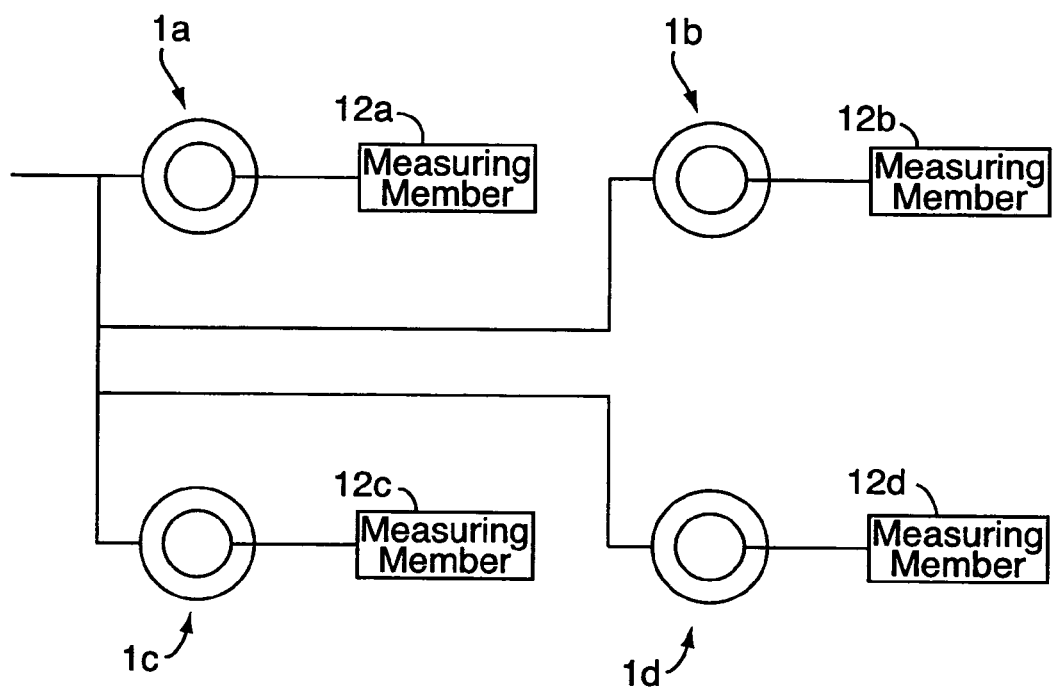
FIG. 3 shows schematically the use of a monitoring device, which monitors the states of four asynchronous machines.

As mentioned above, a number of asynchronous machines 1 may be used in a crane for providing a desired motion to a load lifted by the crane. FIG. 3 shows schematically a monitoring device, which monitor the state of each of the asynchronous machine 1$a$–$d$. A measuring member 12$a$–$d$ measures the rotor voltage of the asynchronous machines 1$a$–$d$. Thereafter, the measuring members 12$a$–$d$ output a signal corresponding to the rotor voltage of each asynchronous machines 1$a$–$d$. This signal may be treated in a signal processor 13 before the signal is sent to the calculating unit 17 and to the control unit 10. In this way, it is possible to monitor the function of each of the asynchronous machines 1$a$–$d$. Thereby, it is possible to discover a fault of any asynchronous machine 1$a$–$d$ and prevent the other asynchronous machines 1$a$–$d$ from working at an unnecessary high torque.

In order to minimise the motor losses, the control unit 10 is arranged to vary the resistance in the circuits 6 in response to the calculated electromagnetic torque. In such a way, the control unit 10 minimises the current in the stator winding by selecting as high resistance as possible in the circuits 6 due to the actual electromagnetic torque. Thereby, the control unit 10 calculates the optimal resistance in the circuits 6 and sends a control signal to the switching device 8. The switching device 8 connects so many resistors 7 in the circuits 6 as possible due to the actual calculated electromagnetic torque.

The invention is not in any way restricted to the embodiment described in the figures, but may be varied freely within the scope of the claims.

We claim:

1. A device for estimating the rotor speed of at least one slip ring asynchronous machine, the asynchronous machine including a stator having a stator winding fed with three-phase voltage and current in order to generate a varying magnetic flux having a rotation speed, and a rotor having a rotor winding in which the magnetic flux generated by the stator winding induces a voltage in the rotor winding, thereby creating an electromagnetic torque which drives the rotor at a rotor speed such that the rotor speed has a slip in relation to the rotation speed of the varying magnetic flux, the device comprising:

a measuring member arranged to measure the voltage in the rotor winding during at least one time period and to output a signal corresponding to the measured voltage in the rotor winding;

a signal processor having a digital signal processor unit arranged to remove noise from a digital signal corresponding to the measured voltage in the rotor winding and to generate an output signal; and a calculating unit arranged to receive the output signal from the signal processor and to calculate a value of the rotor speed based on the output signal.

2. A device according to claim 1, wherein the measuring member is arranged to output an analog signal corresponding to the value of the measured voltage and the signal processor includes an analog signal processor unit.

3. A device according to claim 2, wherein the signal processor includes an A/D converter.

4. A device according to claim 1, wherein the calculating unit calculates the rotor speed by means of a mathematical algorithm.

5. A device according to claim 1, further comprising monitoring means for monitoring the calculated value of the rotor speed in order to detect errors in the function of the asynchronous machine.

6. A device according to claim 5, wherein the monitoring means is arranged to monitor a plurality of asynchronous machines.

7. A control system for a slip ring asynchronous machine, the control system comprising:

the device according to claim 1; and a control unit arranged to use the calculated value of the rotor speed in order to control the asynchronous machine.

8. A control system according to claim 7, wherein the control unit is arranged to control a thyristor device in order to supply said three-phase voltage and current to the stator.

9. A control system according to claim 7, wherein the control unit is arranged to obtain a control signal from an operating device commanded by an operator.

10. A control system according to claim 7, wherein the control system further includes a display arranged to display comprehensive information about the status of the asynchronous machine.

11. A method for estimating the rotor speed of a slip ring asynchronous machine, the asynchronous machine including a stator having a stator winding fed with three-phase voltage and current in order to generate a varying magnetic flux having a rotation speed and a rotor having a rotor winding in which the magnetic flux generated by the stator winding induces a voltage in the rotor winding, thereby creating an electromagnetic torque which drives the rotor at a rotor speed such that the rotor speed has a slip in relation to the rotation speed of the varying magnetic flux, the method comprising the steps of:
    measuring the voltage in the rotor winding during at least a time period and outputting a signal corresponding to the measured voltage in the rotor winding; and
    removing noise from a digital signal corresponding to the measured voltage in the rotor winding; and
    calculating a value of the rotor speed by means of the above measured voltage.

12. A method according to claim 11, further comprising the steps of:
    establishing an analog signal corresponding to the measured voltage; and
    removing noise from the analog signal in an analog signal processor unit.

13. A method according to claim 12, further comprising the step of converting the analog signal to a digital signal.

14. A method according to claim 11, further comprising the step of calculating the rotor speed by using a mathematical algorithm.

15. A method according to claim 11, further comprising the step of monitoring the calculated value of the rotor voltage, frequency, speed, or combinations thereof, in order to detect errors in the function of the asynchronous machine.

16. A method for controlling one or more asynchronous machines, which machines each include a stator having a stator winding arranged to be fed with three-phase voltage and current in order to generate a varying magnetic flux and a rotor having a rotor winding in which the magnetic flux is arranged to induce a voltage to create an electromagnetic torque which drives the rotor with a rotor speed with a slip in relation to a rotation speed of the varying magnetic flux, the method comprising the steps of:
    measuring a value of the voltage in the rotor winding using a measuring member, during at least one time period;
    outputting a signal corresponding to the value of the measured voltage;
    removing noise from a digital signal corresponding to the value of the measured voltage using a signal processor that includes a digital signal processor unit; and
    calculating a value of the rotor speed with a calculating unit that utilizes an output signal from the signal processor.

17. The method of claim 16, further comprising the step of moving a load using the one or more asynchronous machines.

* * * * *

UNITED STATES PATENT AND TRADEMARK OFFICE
CERTIFICATE OF CORRECTION

PATENT NO. : 6,995,539 B1
APPLICATION NO. : 10/110428
DATED : February 7, 2006
INVENTOR(S) : Lars Tuve Hansson et al.

It is certified that error appears in the above-identified patent and that said Letters Patent is hereby corrected as shown below:

Column 8
line 1, please delete the number "11" and replace it with the number --13--.

Signed and Sealed this

First Day of August, 2006

JON W. DUDAS
*Director of the United States Patent and Trademark Office*